No. 619,057. Patented Feb. 7, 1899.
J. B. TREAT.
VEHICLE BRAKE.
(Application filed Oct. 21, 1898.)
(No Model.) 2 Sheets—Sheet 1.
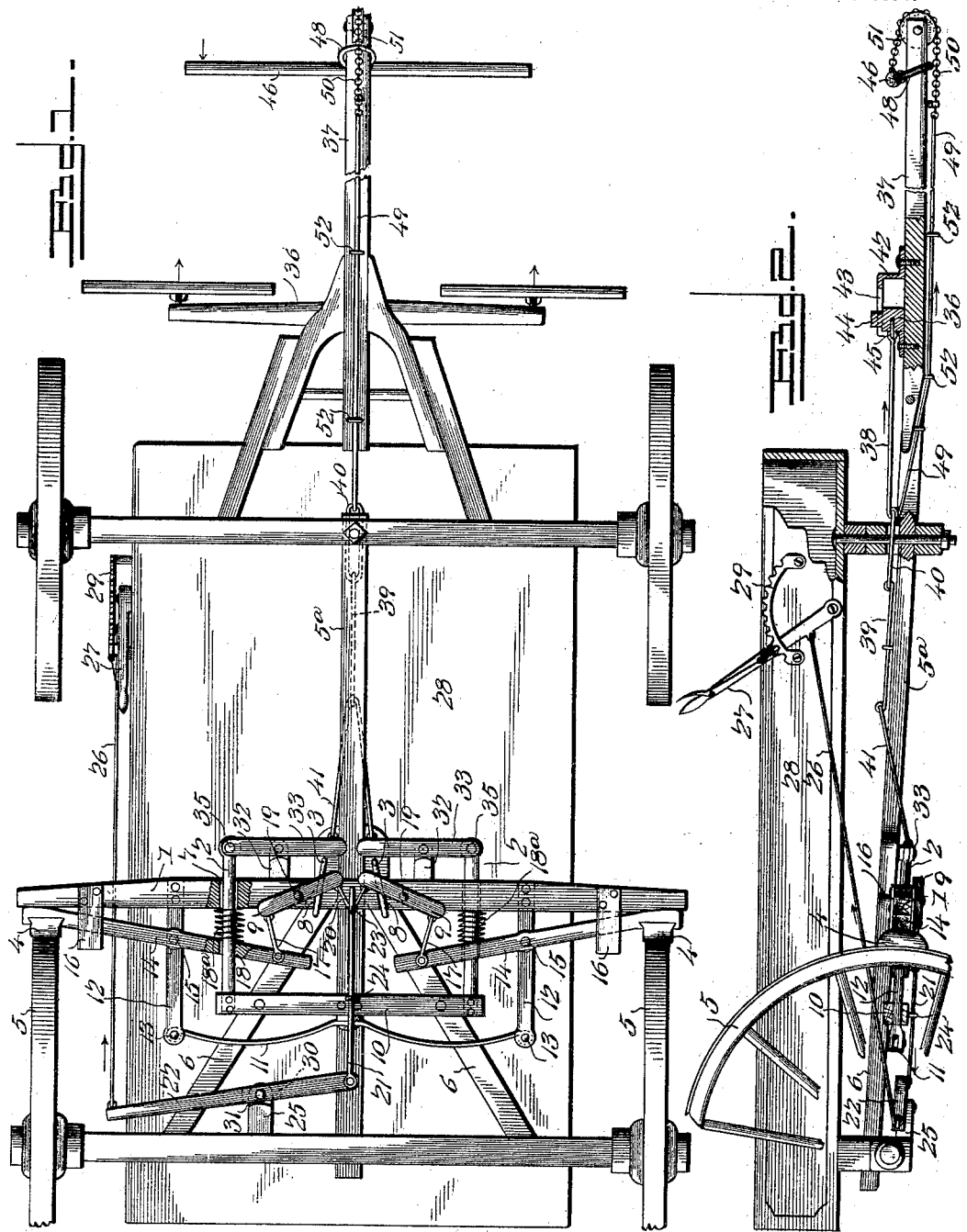
Witnesses
E. F. Stewart
H. F. Riley
John B. Treat Inventor
By C. A. Snow & Co. Attorneys,

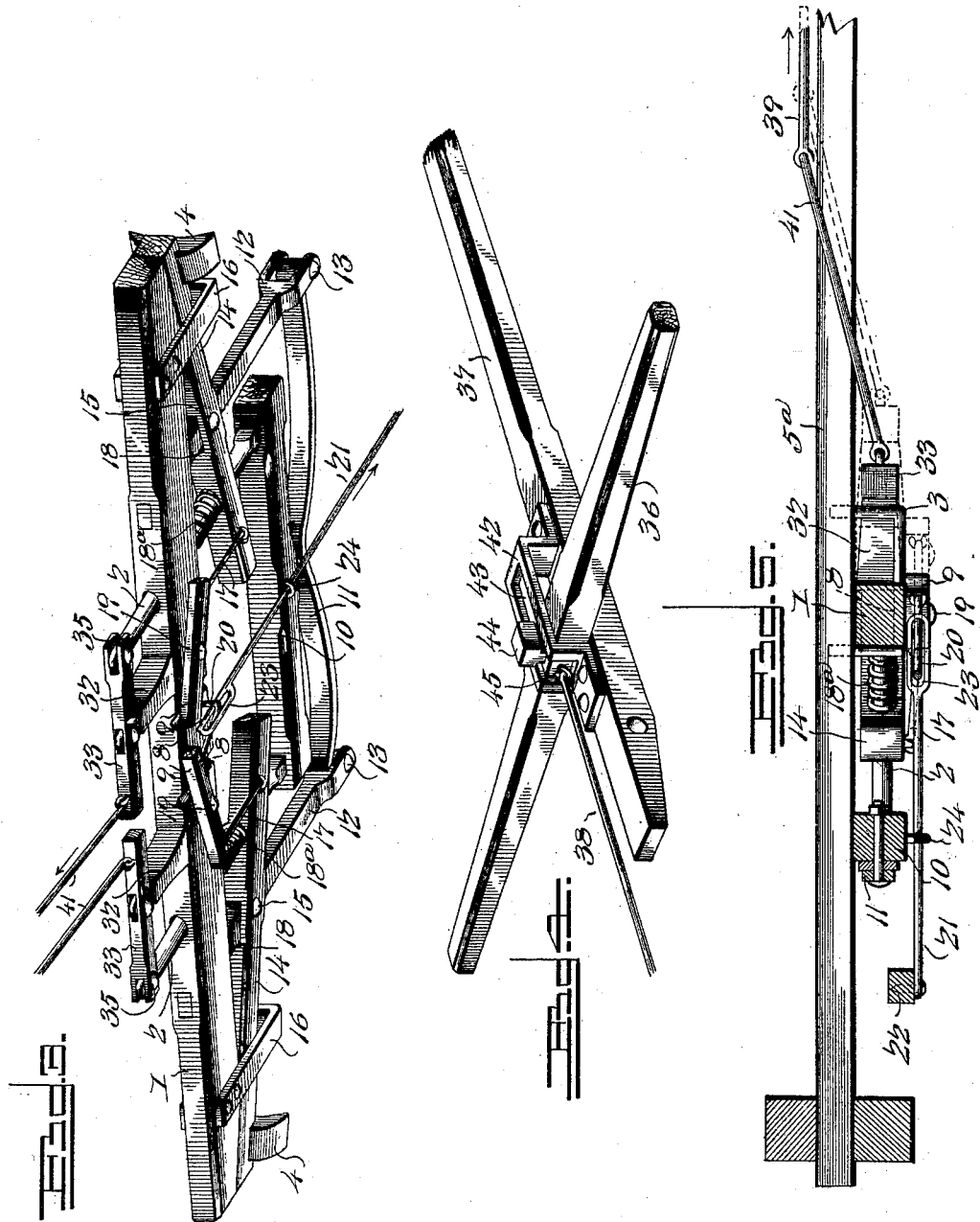

UNITED STATES PATENT OFFICE.

JOHN B. TREAT, OF BOTTOM, TEXAS.

VEHICLE-BRAKE.

SPECIFICATION forming part of Letters Patent No. 619,057, dated February 7, 1899.

Application filed October 21, 1898. Serial No. 694,207. (No model.)

*To all whom it may concern:*

Be it known that I, JOHN B. TREAT, a citizen of the United States, residing at Bottom, in the county of Bell and State of Texas, have invented a new and useful Vehicle-Brake, of which the following is a specification.

The invention relates to improvements in vehicle-brakes.

The object of the present invention is to improve the construction of automatic vehicle-brakes and to provide a simple, inexpensive, and efficient one adapted to relieve the wheels of a wagon when the draft-animals start forward and capable of enabling them to back the vehicle without necessitating any adjustment of the parts by the driver.

A further object of the invention is to enable the brake to be applied by hand after the wheels have been relieved of it by the forward movement of the draft-animals, so that a vehicle may be readily checked should the animals attempt to run away or draw the vehicle at a too high rate of speed.

The invention consists in the construction and novel combination and arrangement of parts, as hereinafter fully described, illustrated in the accompanying drawings, and pointed out in the claims hereto appended.

In the drawings, Figure 1 is a reverse plan view of a vehicle-brake constructed in accordance with this invention. Fig. 2 is a longitudinal sectional view, partly in elevation. Fig. 3 is a detail perspective view of the brake mechanism. Fig. 4 is a detail perspective view illustrating the manner of slidingly and pivotally mounting the doubletree on the pole. Fig. 5 is a sectional view taken longitudinally of the brake mechanism.

Like numerals of reference designate corresponding parts in all the figures of the drawings.

1 designates a transverse brake-beam extending entirely across the rear portion of a running-gear and mounted on longitudinal guide-bars 2 and arranged in suitable guides or keepers 3, whereby it is adapted to move backward and forward to carry brake-shoes 4 into engagement with the hind wheels 5 and to relieve them of the same. The transverse beam 1, which is located on the lower faces of the reach $5^a$ and the rear hound 6, is provided with transverse perforations 7 for the reception of the guide-bars 2, and it has transverse grooves 8 in its lower face to arrange the lower portions of the depending guides or keepers 3 clear of a pair of levers 9, which are fulcrumed on the lower face of the beam 1.

The longitudinal guide-bars, which are located at opposite sides of the rear hounds, are secured to and extend forward from a transverse bar or brace 10, secured to the lower faces of the hounds and provided in its upper face with a central recess for the reception of the reach. The transverse brace or bar 10 forms a support for a transverse spring 11, which is centrally secured to the bar or brace 10 and which has its ends connected to arms 12 of the beam 1, whereby the latter is drawn rearward to hold the brake-shoes 4 against the hind wheels. The central portion of the transverse spring 11 is bowed forward, and the end portions are curved in a reverse direction and present concave front faces and convex rear faces. The arms 12, which extend rearward from the transverse beam 1, have their outer ends bifurcated to receive the terminals of the spring 11, which is provided with suitable eyes for the reception of pivots 13. The brake-shoes 4 are mounted on the outer ends of brake-levers 14, and the latter, which are fulcrumed between their ends on the rearwardly-extending arms 12 by suitable pivots 15, are adapted to be operated independently of the transverse beam 1, so that the brake may be applied by hand after the brake-shoes have been carried away from the wheels by the forward movement of the team in order that the vehicle may be checked to prevent a team from traveling too fast or running away. The outer portions of the brake-levers 14 are supported by rearwardly-disposed rectangular guides or boxes 16, and the inner portions of the levers, which are connected by short rods 17 with the levers 9, are provided with perforations 18, through which pass the guide-bars 2, and coiled springs $18^a$ are interposed between the inner arms of the brake-levers and the brake-beam to hold the outer ends of the levers normally against the ends of the beam. The coiled springs are disposed on the guide-bars 2, and the connecting-rods 17 are secured to the outer ends of the levers 9, which are fulcrumed between their ends at 19, and the inner ends of these levers are hinged to a V-shaped link 20, which is connected by a rod 21 with a rear transverse lever 22. The sides of the V-shaped links are provided with eyes which are linked into suitable eyes of the inner ends of the levers 9, and the rods 17 are similarly connected to the levers 9 and 14. The front end of the rod 21 is provided with a loop 23, into which the apex or bend of the V-shaped link is hooked, and the beam or bar 10 is provided with a guide 24, through which the rod 21 passes.

The rear transverse lever, which is fulcrumed between its ends on a bracket or supporting-arm 25 of the rear axle, has its outer end connected by a rod 26 with a hand-lever 27, arranged at one side of the body 28 of the vehicle and adapted to engage a suitable ratchet 29, whereby the brake-shoes are locked in engagement with the wheels when the brake is applied by hand. The bracket or supporting-arm 25 projects forward from the rear axle, and the rear transverse lever 22 is provided with a suitable slot 30, in which is pivoted a reduced portion or tongue 31 of the bracket or arm 25. When the operating-lever 27 is swung forward, it carries with it the inner ends of the brake-levers, which movement throws the brake-shoes against the wheels, as will be readily understood.

The sliding brake-beam 1 is provided near its center, at opposite sides of the reach, with a pair of forwardly-extending arms 32, forming fulcrums for levers 33, and these levers, which are disposed transversely of the running-gear, are pivoted at their outer ends at 35 to the front terminals of the guide rods or bars 2, which form fixed supports for the levers 33. The inner ends of the levers are connected with the doubletree 36 of the running-gear, and when the draft-animals move forward the strain incident to pulling the vehicle draws the doubletree forward and carries with it the levers 33 and the transverse brake-beam 1 and relieves the wheels of the brake-shoes.

The connection between the doubletree 36, which is slidingly mounted on the pole 37, comprises front and rear rods 38 and 39, an oblong link 40, which is located above the front axle, and a V-shaped connecting-piece 41, which straddles the reach and has its sides attached to the inner ends of the levers 33. The link 40 receives the king-bolt, and the rods 38 and 39 are located in advance and in rear of the front axle.

The whiffletree 36 is arranged in a longitudinal guide or casing 42, composed of a central rectangular portion and ends or flanges extending forward and rearward from the central portion and secured to the pole. The central or guiding portion, which receives the doubletree, is provided with a longitudinal slot or opening 43, which receives the neck of a headed stud or pivot 44, whereby the doubletree has a sliding and pivotal movement on the pole. The doubletree is provided at its rear edge with an eye 45, arranged in the slot or opening and receiving the front end of the rod 38, which is provided with a corresponding eye.

In order to enable the brake to be automatically operated to relieve the wheels of the brake-shoes in backing, the neck-yoke 46 is slidingly connected with the front end of the pole by means of a ring 48, and it is also connected by a rod 49 and a flexible connection 50 with the link 40, whereby when the neck-yoke is drawn backward by the team the transverse levers 33 will be swung forward in the same manner as when they are operated by the doubletree. The rear end of the rod 49 is provided with an eye which engages the link, and the flexible connection 50, which extends forward from the front end of the rod 49, preferably consists of a chain or rope and passes around a pulley 51, which is mounted in a bifurcation of the front end of the pole, and the latter is provided at its lower face with suitable guides 52 for the rod 49.

The invention has the following advantages: The brake, which is simple and comparatively inexpensive in construction, is positive and reliable in operation and is adapted to be readily applied to any ordinary running-gear. When the draft-animals stop or when the traces slacken, the brake is automatically applied, so that in descending a hill or other incline the brake will be applied automatically as soon as the vehicle moves forward on the draft-animals sufficiently to slacken the traces. When it is desired to back a vehicle, the strain on the neck-yoke incident to such backing action of the draft-animals will throw the brake-shoes off the wheels, so that the latter may turn freely. The brake is also adapted to be applied by hand after the brake-shoes have been thrown off the wheels by the action of the draft-animals and the driver is enabled to check the vehicle to prevent horses from running away or from backing too far or the like.

Changes in the form, proportion, and minor details of construction may be resorted to without departing from the spirit or sacrificing any of the advantages of this invention.

What is claimed is—

1. In a device of the class described, the combination with a running-gear, of a transverse beam slidingly mounted thereon and extending entirely across the same, brake-levers mounted on and carried by the transverse beam and provided with brake-shoes, means for sliding the beam to carry the brake-shoes into and out of engagement with the wheels, and operating mechanism connected with the brake-levers, whereby the brake may be applied by hand independently of the means for actuating the transverse brake-beam, substantially as described.

2. In a device of the class described, the combination with a running-gear, of a movable brake-beam extending across the running-gear and mounted thereon, brake-levers mounted on and carried by the brake-beam and provided with shoes, hand-operated mechanism connected with the brake-levers, transverse levers connected with the brake-beam, and means for connecting the transverse levers with the draft-animals, whereby the brake-beam is operated by the same to relieve the wheels of the brake-shoes, substantially as described.

3. In a device of the class described, the combination with a running-gear, of a movable transverse beam extending across the same, a spring located in rear of the beam and connected with the same, brake-levers mounted on and carried by the brake-beam and provided with brake-shoes, and independent means for operating the brake-levers and the brake-beam, substantially as described.

4. In a device of the class described, the combination with a running-gear, of a movable beam extending across the same, brake-levers mounted on and carried by the beam and provided with brake-shoes, a spring connected with the beam and adapted to hold the brake-shoes in engagement with the wheel, means for connecting the beam with the draft-animals, and hand-operated mechanism connected with the brake-levers, substantially as described.

5. In a device of the class described, the combination with a running-gear, of a transverse brake-beam mounted on the running-gear and capable of moving backward and forward said beam being provided with forwardly and rearwardly disposed arms arranged in pairs, brake-levers fulcrumed on the rearwardly-disposed arms and provided with brake-shoes, the transverse lever connected with the forwardly-disposed arms, and independent operating mechanism connected with the levers, substantially as described.

6. In a device of the class described, the combination with a running-gear, of longitudinal guide-bars mounted thereon, a sliding brake-beam arranged on the guide-bars, and provided with arms extending forwardly and rearwardly from it and arranged in pairs, brake-levers fulcrumed on the rearwardly-disposed arms and provided with brake-shoes, the front transverse lever fulcrumed on the guide-bars and connected with the forwardly-extending arms of the brake-beam, and independent operating mechanism connected with the levers, substantially as described.

7. In a device of the class described, the combination with a running-gear, of longitudinal guide-bars, a transverse brake-beam slidingly mounted on the guide-bars, brake-levers fulcrumed on and carried by the transverse beam and provided with brake-shoes, a spring connected with the beam and adapted to hold the brake-shoes in engagement with the wheels, front transverse levers fulcrumed on the guide-bars and connected with the transverse beam, and means for operating the levers, substantially as described.

8. In a device of the class described, the combination with a running-gear, of a movable brake-beam extending across the same, brake-levers fulcrumed on and carried by the beam and provided with brake-shoes, front transverse levers connected with the brake-beam, a spring also connected with the brake-beam and adapted to hold the brake-shoes in engagement with the wheels, hand-operated mechanism connected with the brake-levers, and means for connecting the front transverse levers with the draft-animals, substantially as and for the purpose described.

9. In a device of the class described, the combination with a running-gear, of longitudinal guide-bars, a sliding brake-beam mounted thereon and disposed transversely of the running-gear, brake-levers fulcrumed on the beam and provided with brake-shoes, coiled springs disposed on the guide-bars and interposed between the beam and the brake-levers, and independent means for operating the brake-levers and the brake-beam, substantially as described.

10. In a device of the class described, the combination with a running-gear, of longitudinal guide-bars, a sliding brake-beam mounted thereon and disposed transversely of the running-gear, said beam being provided with a pair of rearwardly-disposed arms, brake-levers fulcrumed on the arms and provided with brake-shoes, a transverse spring mounted on the running-gear and connected with the said arms, coiled springs disposed on the guide-bars and interposed between the brake-levers and the brake-beam, means for operating the brake-beam automatically, and hand-operated mechanism connected with the brake-levers, substantially as described.

11. In a device of the class described, the combination with a running-gear, of a transverse brake-beam mounted on the running-gear, brake-levers fulcrumed on and carried by the brake-beam and provided with brake-shoes, a spring for holding the brake-beam at the rearward limit of its movement, means for automatically operating the brake-beam, the levers 9 fulcrumed on the brake-beam and connected at their outer ends with the inner terminals of the brake-levers, a transverse lever fulcrumed on the running-gear and connected with the inner ends of the levers 9, and a hand-lever connected with the transverse lever, substantially as described.

12. In a device of the class described, the combination of a running-gear provided with a transverse bar, guide-bars extending from the transverse bar and disposed longitudinally of the running-gear, a sliding brake-beam mounted on the guide-bars and provided with forwardly and rearwardly extending arms disposed in pairs, a transverse frame mounted on the transverse bar and connected with the rearwardly-disposed arms of the brake-beam, brake-levers fulcrumed on the rearwardly-disposed arms and provided with brake-shoes, the front transverse levers fulcrumed on the guide-bars and connected with the forwardly-extending arms of the brake-beam, springs interposed between the brake-levers and the brake-beam, guides or keepers supporting the brake-levers and the brake-beam, and means for operating the brake-levers and the front transverse levers, substantially as described.

13. In a device of the class described, the combination with a running-gear, of a movable transverse beam, brake-shoes, transverse levers connected with the brake-beam, a sliding doubletree, a V-shaped connecting-piece extending forward from the transverse levers and straddling the pole, a link receiving the king-bolt and the front and rear rods connected with the link and extending from the same to the doubletree and to the V-shaped connecting-piece, substantially as described.

14. In a device of the class described, the combination with a running-gear, of a transverse beam slidingly mounted thereon, a spring connected with the transverse beam and adapted to move the same rearwardly, a neck-yoke connected with the beam and adapted to draw the same forward, movable brake-shoes mounted on the transverse beam, and means for moving the brake-shoes rearwardly when the transverse beam is held away from the wheels by the neck-yoke, substantially as described.

15. In a device of the class described, the combination with a running-gear, of a transverse beam slidingly mounted thereon, brake-shoes movably mounted on the transverse beam, a spring connected with the transverse beam for holding the brake-shoes normally in engagement with the wheels, connections between the transverse beam and the draft-animals, to throw the brake-shoes off the wheels, and means for operating the brake-shoes independently of the brake-beam to enable the brake to be applied by hand when the brake-beam is drawn forward by the draft-animals, substantially as described.

In testimony that I claim the foregoing as my own I have hereto affixed my signature in the presence of two witnesses.

JOHN B. TREAT.

Witnesses:
JASPER N. TREAT,
JOHN R. HILL.